(12) United States Patent
Degliantoni et al.

(10) Patent No.: US 7,665,660 B2
(45) Date of Patent: Feb. 23, 2010

(54) REAL-TIME AWARDS DETERMINATIONS

(75) Inventors: Lori Degliantoni, San Carlos, CA (US); Barbara Patterson, S. San Francisco, CA (US); David Chauncey Shepard, Novato, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 106 days.

(21) Appl. No.: 11/683,866

(22) Filed: Mar. 8, 2007

(65) Prior Publication Data

US 2008/0217397 A1   Sep. 11, 2008

(51) Int. Cl.
*G06K 15/00* (2006.01)
*G06Q 30/00* (2006.01)

(52) U.S. Cl. .................. 235/383; 235/375; 235/380; 705/14

(58) Field of Classification Search .................. 235/380, 235/383, 375; 705/14
See application file for complete search history.

(56) References Cited

U.S. PATENT DOCUMENTS

| 6,216,111 | B1 * | 4/2001 | Walker et al. ................ 705/14 |
| 7,320,428 | B2 * | 1/2008 | Sisko et al. ................. 235/379 |
| 2002/0188509 | A1 * | 12/2002 | Ariff et al. ..................... 705/14 |
| 2003/0036952 | A1 | 2/2003 | Panttaja et al. |
| 2003/0216967 | A1 * | 11/2003 | Williams ..................... 705/14 |
| 2004/0044577 | A1 | 3/2004 | Sisko et al. |
| 2004/0122736 | A1 * | 6/2004 | Strock et al. ................. 705/14 |
| 2005/0040230 | A1 | 2/2005 | Swartz et al. |
| 2006/0118611 | A1 * | 6/2006 | Michelsen et al. .......... 235/375 |
| 2006/0253320 | A1 | 11/2006 | Heywood |
| 2008/0201224 | A1 * | 8/2008 | Owens et al. ................. 705/14 |
| 2008/0262925 | A1 * | 10/2008 | Kim et al. ..................... 705/14 |

* cited by examiner

*Primary Examiner*—Thien M. Le
*Assistant Examiner*—Tuyen K Vo
(74) *Attorney, Agent, or Firm*—May M. Mowzoon; Quarles & Brady LLP

(57) ABSTRACT

The present invention provides systems and methods for facilitating transactions with real-time awards determinations for a cardholder. Each transaction includes transaction information, where the transaction information includes: cardholder information, merchant information, and a transaction amount. An engine determines if an award should be granted based on award criteria, such that the engine compares the transaction information with each award criterion in order to determine if the award should be granted in real-time with the transaction by the cardholder.

23 Claims, 12 Drawing Sheets

REAL-TIME AWARDS DETERMINATIONS

BACKGROUND

This invention relates, in general, to systems and methods for electronically processing financial transactions.

Credit card reward programs typically reward credit card customers and/or cardholders with rewards such as points or miles that are generally based on the dollar amounts of goods or services purchased using the credit card. These point rewards or reward miles are typically reflected in the cardholder's monthly statement or may be tracked by a third-party reward company which may communicate the reward totals to the cardholder in quarterly, monthly, or online statements.

Referring now to FIG. 1, a conventional credit card processing system includes a cardholder that makes a purchase from a merchant using a credit card that the cardholder acquired from the issuer, also known as the cardholder's financial institution or bank. In order to process the transaction, the merchant typically uses a point-of-sale device, which transmits a payment authorization request to the merchant's bank, also known as of the acquirer. The acquirer transmits the payment authorization request, which conventionally includes merchant identification, the credit card number, and the requested dollar amounts, to the cardholder's bank or the issuer through a transaction processing network or payment system. If the issuer determines that the authorization requests should be granted, the issuer generates an authorization response message that the request is approved, which is transmitted through the transaction processing network to the acquirer and ultimately to the merchant. The merchant then completes the transaction with the cardholder. During settlement, the acquirer pays the merchant for the cardholder's purchases, and the acquirer sends the charges over the transaction processing network to be processed by the issuer, which charges the cardholder for the purchase and reflects such charges in a cardholder statement.

In such a system of FIG. 1, the issuer may award the cardholder with points or miles based on the dollar amounts of all the transactions involving the credit card, without regard to the nature or type of transaction.

One problem with such a point based reward system is that the reward is made available to the cardholder months after the cardholder makes a purchase using the credit card. Therefore, what is needed is a system and method for providing real-time rewards for cardholders. Furthermore, what is needed is a system and methods that allows decision-making and business logic for determining cardholder rewards within various different components of a credit card processing system.

SUMMARY

One embodiment of the present invention discloses a method for providing a loyalty reward for use of a credit card in a transaction between a cardholder and a merchant. The method includes reading transaction data associated with the transaction, comparing the transaction data against one or more award criteria, and based on the comparing operation, awarding the cardholder the loyalty reward.

In one embodiment, the reading operation includes reading merchant identification from the transaction data, reading a credit card number from the transaction data, and/or reading a purchase amount from the transaction data. In one example, the award criteria may include a date of the transaction, a range of credit card numbers, a unique merchant identification number, and/or a minimum purchase amount.

In one embodiment, the comparing operation is performed by the issuer. In another embodiment, the comparing operation is performed by the acquirer, in another, the comparing operation is performed by the payment system operator, and in another embodiment, the comparing operation is performed by the merchant.

In another embodiment, the method may also include encoding promotion data within a payment authorization request message. The promotion data may include data defining a promotion type, a promotion code, and/or promotion related text that may be displayed at the point-of-sale by the merchant. In this example, the encoding operation may be performed by the acquirer or by the payment system operator.

In another embodiment, the method may also include encoding promotion data with a payment authorization response message, wherein the promotion data includes data defining a promotion type, a promotion code, and/or promotion related text. In this example, the encoding operation may be performed by the issuer or by the payment system operator.

In this manner, the determination of whether a credit card transaction should qualify for an award can be dynamically made in real-time if desired.

BRIEF DESCRIPTION OF THE DRAWINGS

The features, utilities and advantages of the various embodiments of the invention will be apparent from the following description of the various embodiments and examples of the present invention as illustrated in the accompanying drawings. It is to be noted, however, that the appended drawings illustrate only typical embodiments of this invention and, hence, are not to be considered limiting the scope of the present invention, for the invention may admit to other equally effective embodiments.

DETAILED DESCRIPTION

Figure 5:
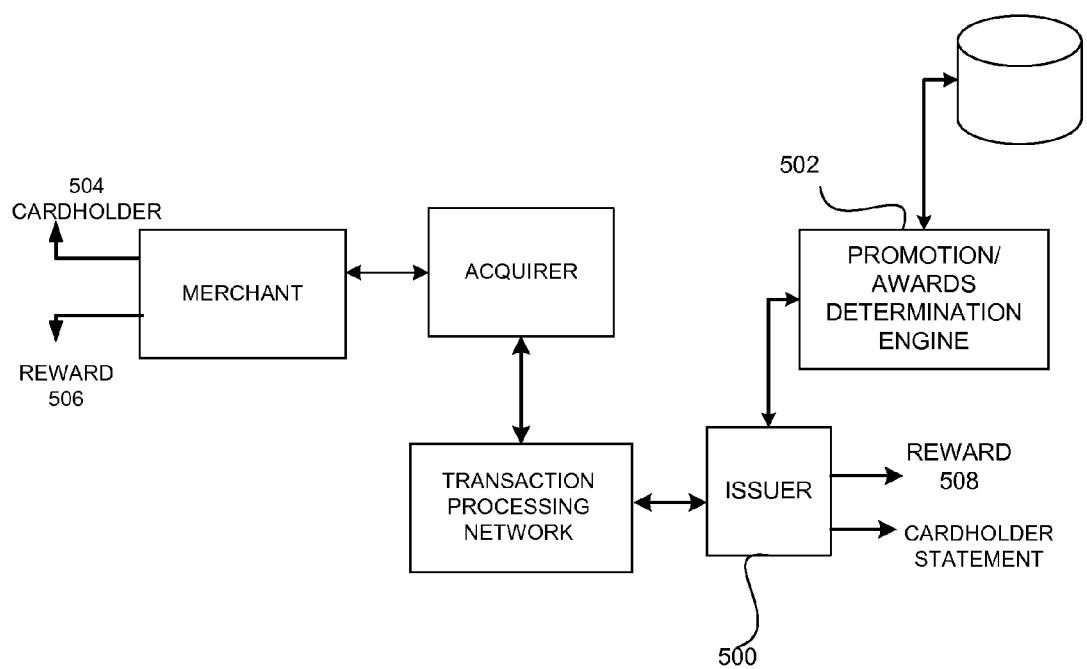
FIG. 5 illustrates a block diagram of a credit card processing system wherein the issuer has an award determination engine, in accordance with one embodiment of the present invention.
Figure 6:
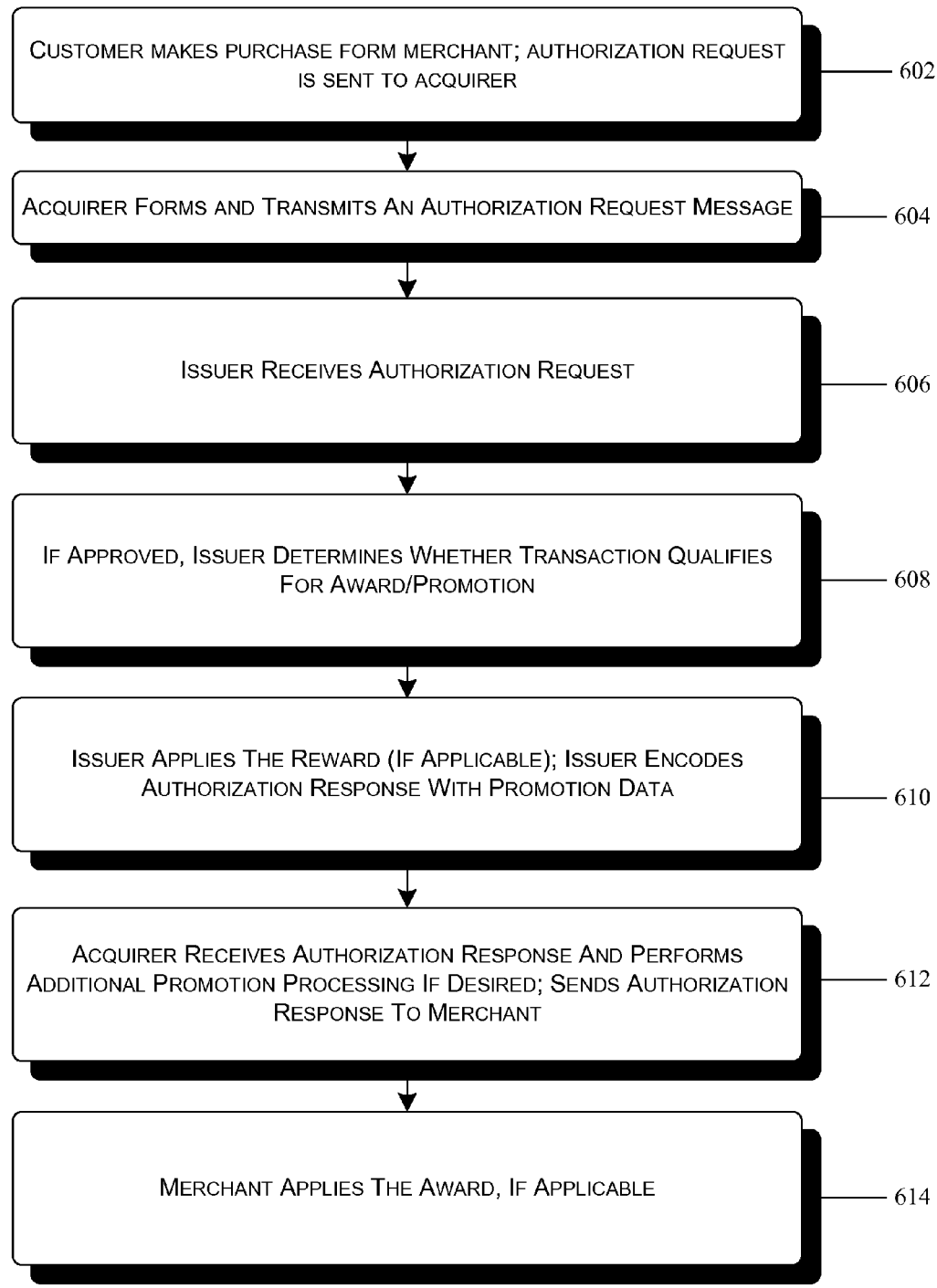
FIG. 6 illustrates an example of logical operations for determining awards by the issuer in a credit card processing system, in accordance with one embodiment of the present invention.
Figure 7:
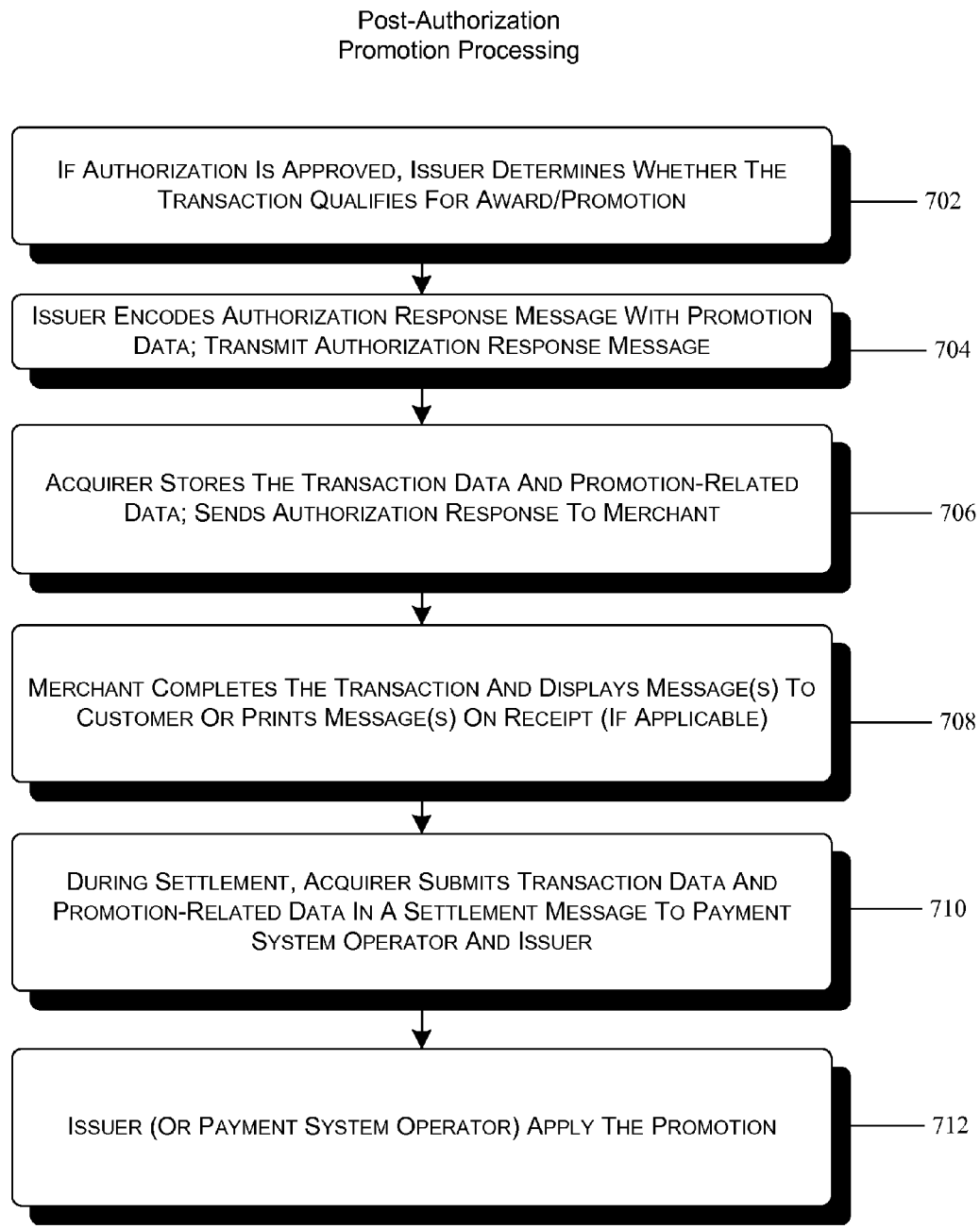
FIG. 7 illustrates an example of logical operations for determining awards, after transaction authorization, by the issuer in a credit card processing system, in accordance with one embodiment of the present invention.

Embodiments of the present invention relate to a credit card processing system and method wherein components or entities such as the acquirer, issuer, or transaction processing network can dynamically determine, at the time of the transaction in real time or during transaction settlement, whether a credit card transaction qualifies for a promotion, award, or reward. For example, FIGS. 2-4 describe embodiments of the invention where the acquirer is provided with logic for determining whether to provide awards for a credit card transaction; FIGS. 5-7 describe embodiments of the invention where the issuer is provided with logic for determining whether to provide awards for a credit card transaction; and FIGS. 8-12 describe embodiments of the invention where the transaction processing network is provided with logic for determining whether to provide awards for a credit card transaction. Various embodiments of the present invention are described herein.

As used herein, the term "credit card" includes but is not limited to, for example, credit cards, debit cards, bank cards, store-issued cards, prepaid cards, contactless cards, gift cards, or any conventional payment card that a customer can use in lieu of a cash or paper check payment, and these terms are used interchangeably herein.

The term "award" includes but is not limited to a loyalty award, promotion, reward, discount, rebate, sweepstakes entry, point(s) or bonus points, miles, instant-win award, product or service upgrade, or any conventional form of award given in exchange for credit card usage.

The term "cardholder" includes but is not limited to, for example, a cardholder of any type of credit card, which is defined herein, a customer or account holder, and these terms are used interchangeably herein.

The term "acquirer" includes but is not limited to the merchant's payment processor, the merchant's bank or financial institution, and these terms are used interchangeably herein.

The term "issuer" includes but is not limited to the credit card issuer, the cardholder's bank or financial institution, and these terms are used interchangeably herein.

The term "transaction processing network" includes but is not limited to an electronic payment system as well as any conventional network and/or system for authorizing electronic payments and/or settling such payments between entities in a credit card system.

Embodiments of the present invention are intended to be used with transactions where the cardholder physically presents a credit card to a merchant for swiping or other data entry as well as instances where a cardholder provides the credit card information to a merchant when the cardholder is not physically present at the merchant's location, such as via a remote terminal, through use of a computer connected to the Internet, or over the telephone.

Figure 1:
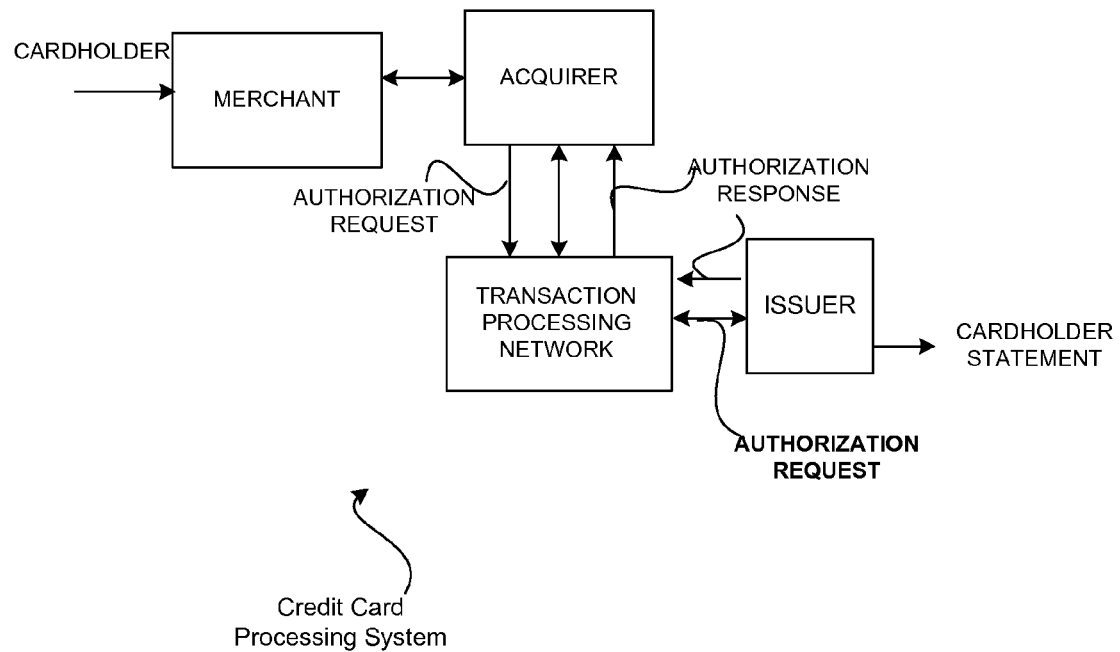
FIG. 1 is a PRIOR ART illustration in block diagram of a conventional credit card processing system.
Figure 2:
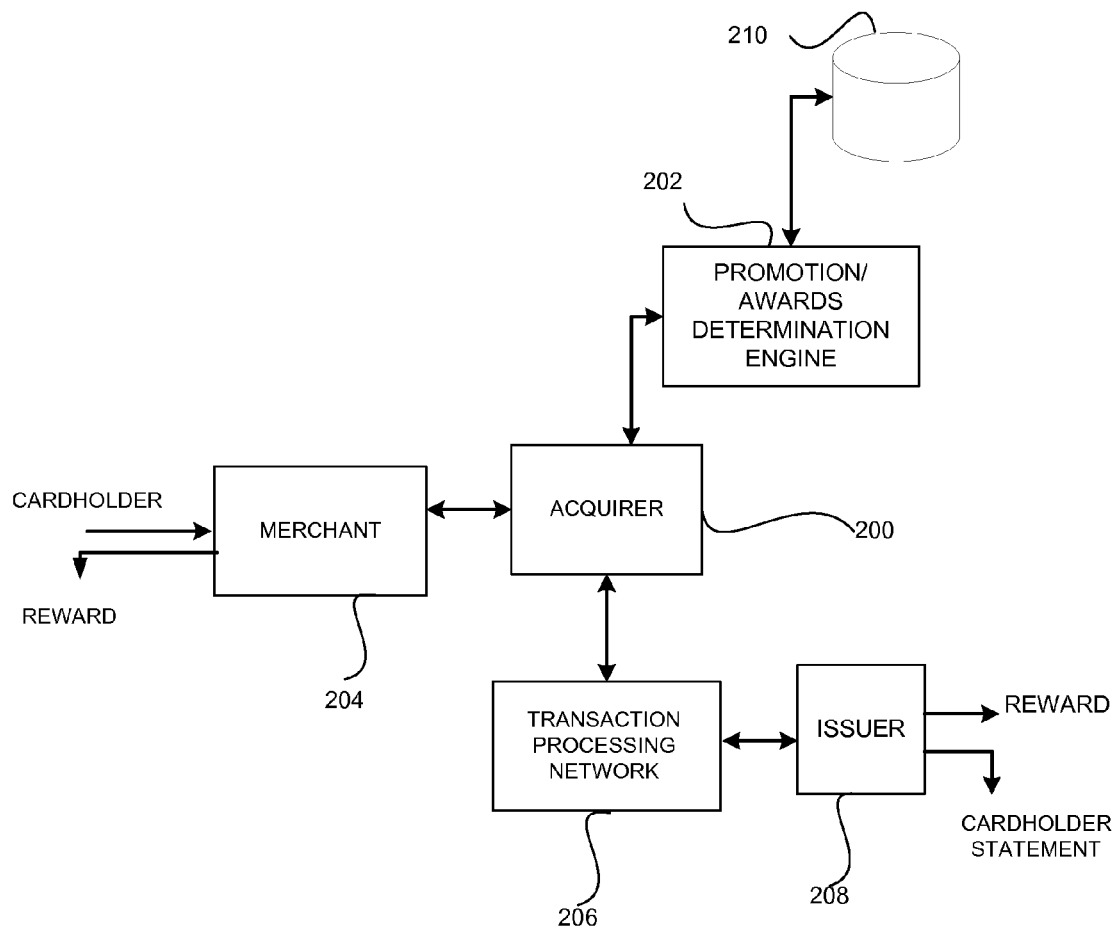
FIG. 2 illustrates a block diagram of a credit card processing system wherein the acquirer has an award determination engine, in accordance with one embodiment of the present invention.

Referring now to FIG. 2, one example of the present invention is illustrated, wherein an acquirer 200 is provided with an awards determination engine 202. The acquirer 200 communicates with a merchant 204 as well as a transaction processing network 206, which is in communication with an issuer 208. The acquirer 200 uses the engine 202 to dynamically and in real-time determine whether a particular credit card transaction qualifies for an award.

In one example, the awards determination engine 202 of FIG. 2, as well as for the other embodiments disclosed herein, is provided with one or more rules or award criteria that are used to compare a given transaction or transaction data against, in order to determine whether the transaction qualifies for an award. For instance, an award criteria may include a comparison between the credit card number that is involved in the transaction against a list or range of credit card numbers that are eligible for an award. In another example, an award criteria may include a comparison of the transaction date against an award eligible date. In another example, an award criteria may include a comparison of the transaction amount (i.e., purchase amount) against an award eligible purchase amount. In another example, an award criteria may include a comparison of the transaction data against an award eligible SKU number associated with a product. In another example, an award criteria may include a comparison of the merchant identification involved in a transaction (i.e., the merchant of the transaction) against a list of merchants that will qualify the transaction for an award. For example, the merchant identification can include using a unique merchant identification number. In another example, an award criteria may include a random granting of an award to the cardholder. In another example, rules or award criteria may include consideration of the point-of-entry (such as using magnetic stripe, contactless, phone, or wireless) of the transaction, type of merchant (such as online, phone, mail order, or in store), category of merchant (such as gas, grocery, or hardware), and geographical based rules (such as city, state, region, or country).

Another example of an award criteria may include a count of the number of customers which have utilized a particular type of credit card at a particular merchant in order to determine whether this transaction qualifies for an award, i.e., a customer is the "one millionth customer" using a type of credit card at a merchant.

In another embodiment, an award criteria may include a count or threshold of the number of transactions which the cardholder has executed at a particular merchant. Accordingly, an award may be given after the threshold has been exceeded—i.e., the customer is awarded for the "tenth purchase at this merchant" or a predetermined number of purchases.

One benefit of embodiments of the present invention includes providing issuers 208, merchants 204, acquirers 200 and payment system operators with the ability to easily implement a variety of different promotions. These promotions can encourage customers to visit the merchants 204 and to make purchases. It is understood that depending upon the implementation, the awards determination engine 202 may implement one or more different award criteria as desired. In one example, one or more databases or storage devices 210 may provide for storing awards criteria and other award eligibility data. The databases 210 may be coupled with or in communications with the award determination engine 202.

Referring again to FIG. 2, in one example the acquirer 200 receives credit card transaction data, either before payment authorization or after payment authorization, and determines whether the transaction is eligible for an award. For instance, the acquirer 200 may determine, before payment authorization, that a transaction is eligible for an award and the acquirer 200 may encode messages to the issuer 208, the transaction processing network 206, or the merchant 204 with promotion data.

Figure 11:
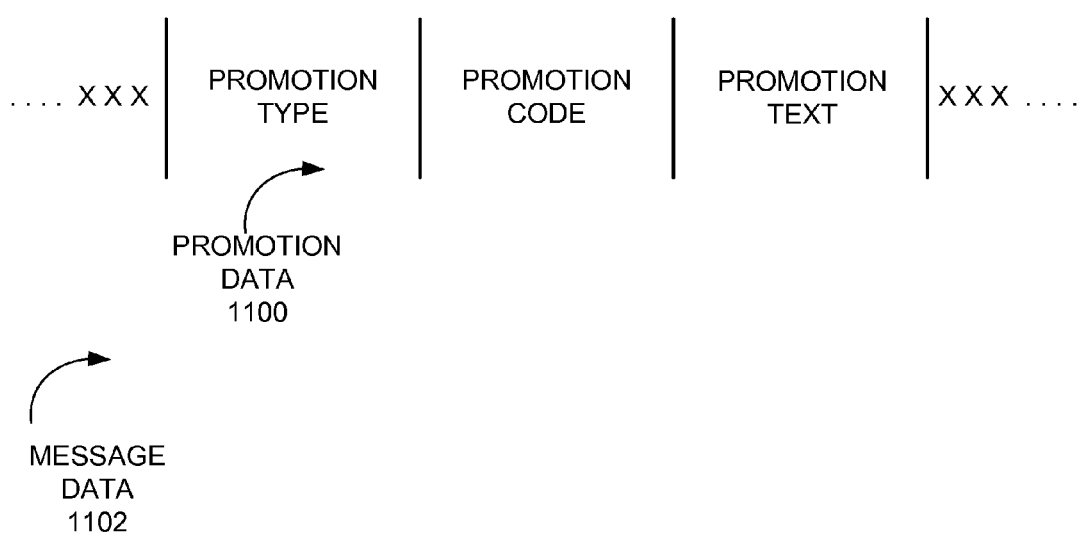
FIG. 11 illustrates an example of a message data stream having promotion data encoded therein, in accordance with one embodiment of the present invention.

Referring now to FIG. 11, promotion data 1100 is embedded in or encoded within message data or the payload of a message 1102 that is transmitted over a credit card processing system, in accordance with one embodiment of the present invention. Generally, promotion data may include, but is not limited to, a promotion type which may indicate the type of promotion (i.e., a discount, sweepstakes, bonus points, or any type of award); a promotion code, indicating the specific promotion or award for which the transaction qualifies; and a promotion description, which may be utilized to provide textual information to the merchant for display to or presentation to the cardholder, or to print on a receipt, or for action by the merchant. Other data fields or data types for communicating award-related data may be provided as desired. Promotion data may be encoded within a payment authorization request message, a payment authorization response message, or messages related to settlements of payments within a credit card processing system, in accordance with embodiments of the present invention.

Referring to FIG. 2, after the acquirer 200 has determined that the transaction should receive an award, the award may be provided to the cardholder in real-time at the point of sale, if desired. Alternatively, the award may be provided to the cardholder as a credit on the cardholder's statement. The manner in which the award will be delivered depends, in part, on the nature of the award as well as the provider of the reward. For instance, an award of a purchase price discount, an instant cash prize, or other instant awards may be provided to the cardholder at the point-of-sale in real time. In another example, an award such as extra bonus loyalty points may be reflected in the cardholder's statement.

In another example, the transaction occurs after comparison of relevant transaction and/or promotion related data, and a decision is made to provide the specific award or promotion. The amount of the transaction or promotion may be modified by the issuer 208 or the payment system operator in order to instantly decrease the amount of the transaction (such as a sale or use of points) by the specific award amount or promotion. The amount of the transaction or promotion would be modified in real time to, for example, reduce the amount of the transaction by the amount of the promotion or award. In this manner, the amount of the transaction is "partially approved". The original transaction is referenced in this transaction, along with the promotional code, description and/or promotion type. This enables the issuer 208, transaction processing network 206, acquirer 200, or a loyalty program processor to communicate with the merchant 204 that the difference between the original transaction and this transaction will be funded by an alternate source (such as the merchant 204, the issuer 208, a third party, or shared among any of these).

Figure 3:
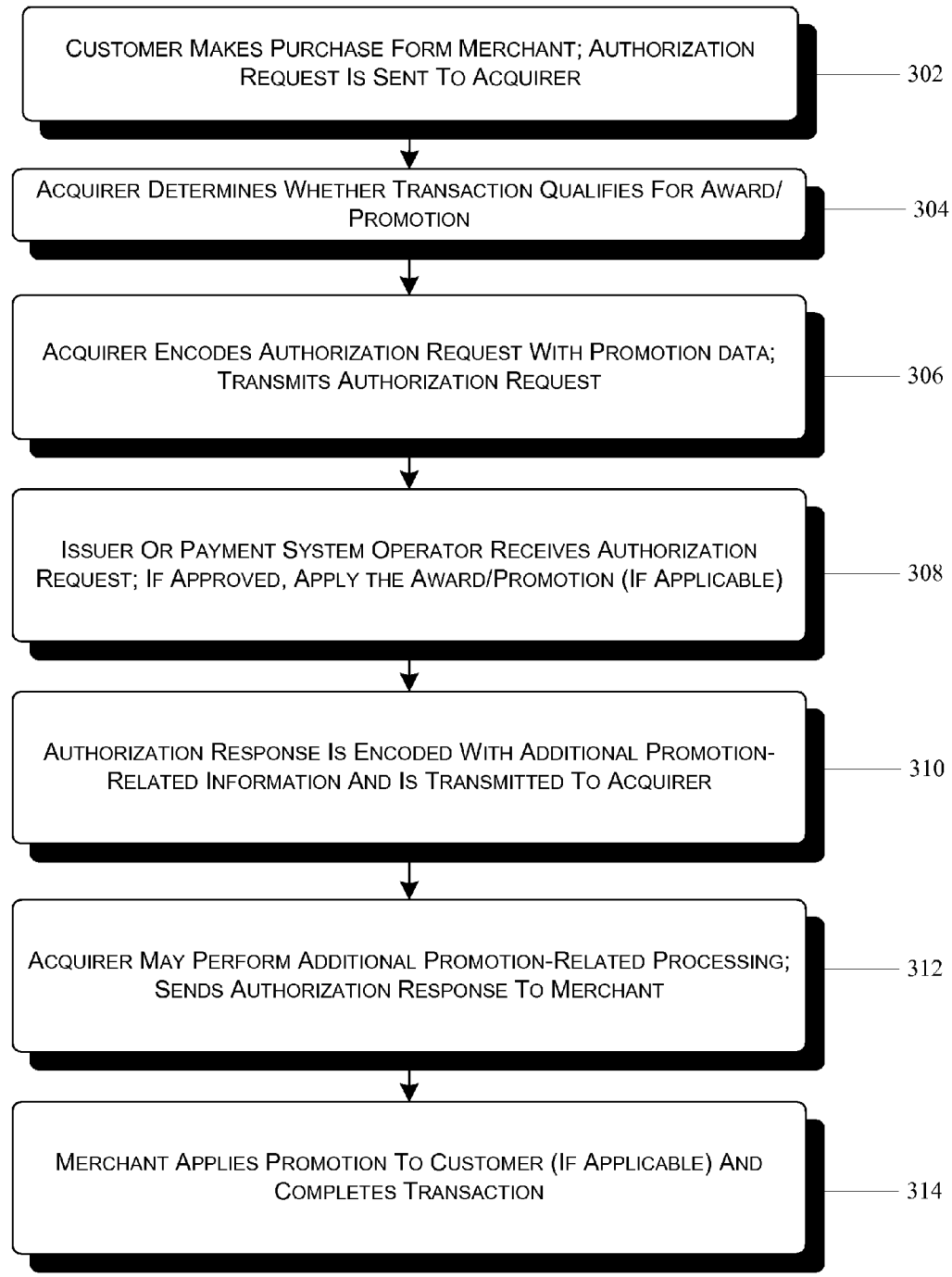
FIG. 3 illustrates an example of logical operations for determining awards by the acquirer in a credit card processing system, in accordance with one embodiment of the present invention.

Referring now to FIG. 3, logical operations for determining awards by the acquirer in a credit card processing system, in accordance with one embodiment of the present invention, is shown. At operation 302, the customer makes a purchase from a merchant. The merchant's point-of-sale device (conventional) generates and transmits a payment authorization request to the acquirer. At operation 304, having received the payment authorization request, the acquirer determines whether the transaction qualifies for an award. Operation 304 may utilize any of the award criteria described herein, or otherwise as desired depending on the particular implementation. At operation 306, if the acquirer determines that the transaction is eligible for an award, the acquirer encodes promotion data within the payment authorization request data to form a revised payment authorization request message for transmitting over the network to the issuer. The revised payment authorization request message has the appropriate promotion data embedded therein that reflects the type/nature of the specific award being given as well as the amount of the award, in one example. In one example, operations 304-306 may be implemented by the awards determination engine.

The acquirer transmits the revised payment authorization request to the transaction processing network, and in operation 308, the issuer receives the payment authorization requests. If the payment authorization request is granted, the award can be applied by either the issuer or the payment system operator, if applicable. Regardless of how the award is applied, the award can be funded by any entity or any combination of entities, including the merchant, the acquirer, the issuer, the payment system operator, or processor network provider, or a third party loyalty program operator or processor. For instance, a purchase discount amount for the transaction can be calculated based on the terms of the promotion, or loyalty points can be calculated that will be credited to the cardholder and each could be funded by the merchant, the issuer, the provider/operator, the acquirer, or a third party.

At operation 310, the payment authorization response may be encoded with additional award-related information and is transmitted to the acquirer. The additional information may include, for example, a reduction in the purchase amount representing a purchase discount; a quantity of reward program bonus points to be applied to the cardholder's loyalty program account; a text message about an award or promotion that can be displayed at the point-of-sale to the merchant and to the cardholder, or printed on the cardholder's receipt. The same text message may be provided to a communication device of the cardholder.

At operation 312, the acquirer may perform additional award related processing, if desired, or may merely send the payment authorization response message, which includes the promotion data, to the merchant.

At operation 314, the merchant applies the promotion to the customer and if applicable, then to the particular type of award and completes the transaction. For instance, if the award was a purchase price discount, then the merchant would complete the purchase including the purchase discount; or if the award was a hotel room upgrade communicated via promotion text in the promotion data in the payment authorization response then the merchant provides the cardholder with the hotel room upgrade.

Figure 4:
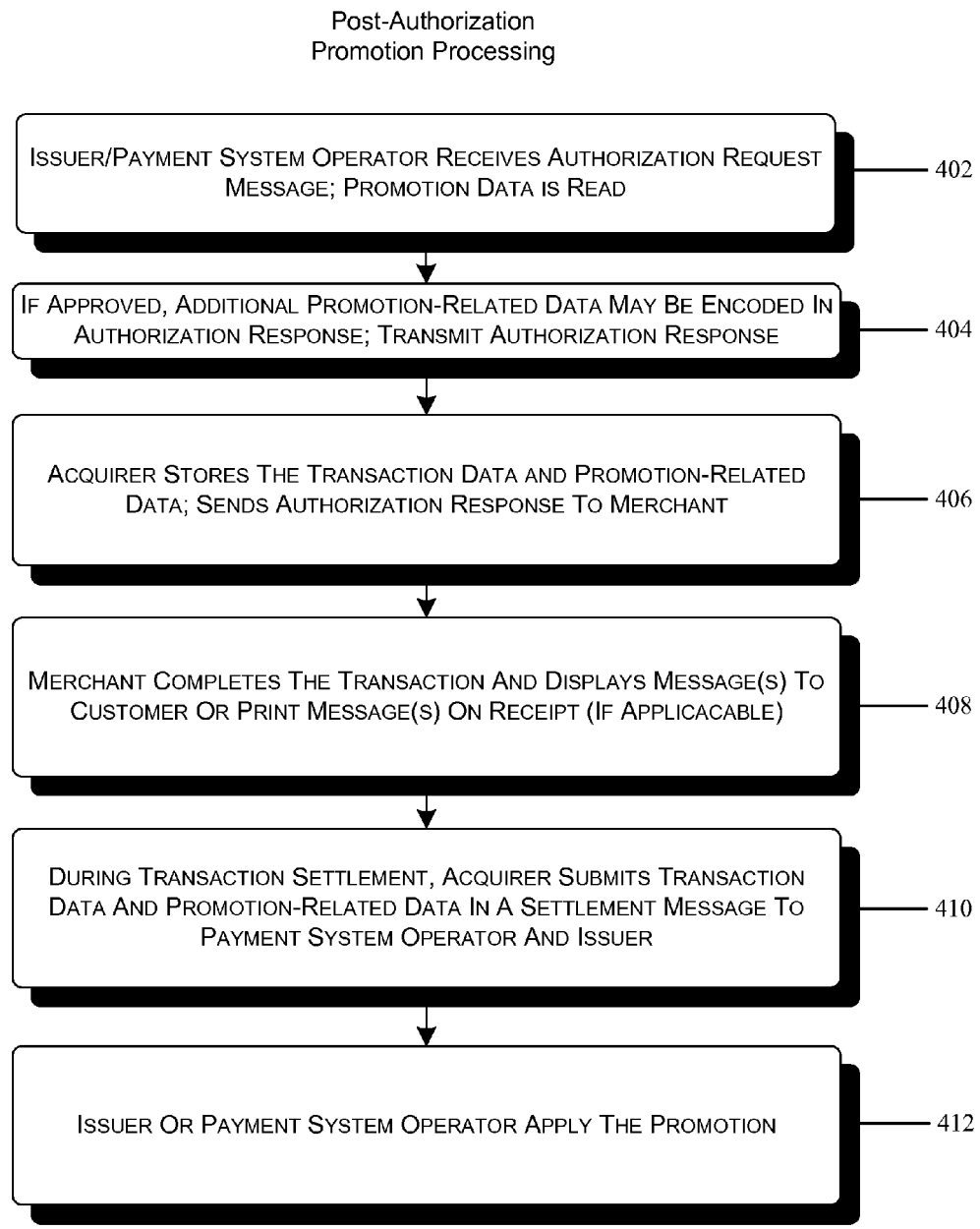
FIG. 4 illustrates an example of logical operations for determining awards, after transaction authorization, by the acquirer in a credit card processing system, in accordance with one embodiment of the present invention.

Referring now to FIG. 4, in another embodiment award processing may occur post payment request authorization. In one embodiment, operations 402 to 412 may be performed in place of operations 308 to 314 of FIG. 3. At operation 402, the issuer or payment system operator receives the payment authorization request message, and the promotion data in the message is read. At operation 404, if the transaction is approved, additional promotion related data may be encoded in an authorization response message, in a manner similar to operation 310 as described above with respect to FIG. 3. The authorization response message is then transmitted, and at operation 406, the acquirer stores the transaction data and promotion related data read from the payment authorization response message. The acquirer then sends the payment authorization response message to the merchant. At operation 408, the merchant completes the transaction and displays any messages to the customer or prints messages on the receipt, if applicable. At operation 410, during transaction settlement, the acquirer submits transaction data and promotion related data in a settlement message transmitted to the payment system operator and issuer. At operation 412, the issuer or payment system operator applies the promotion for the benefit of the cardholder, if appropriate.

Referring now to FIG. 5, another embodiment of the present invention shows an issuer 500 with an award determination engine 502. Because issuers are the banks or financial institutions which issued credit cards to their cardholders, providing the issuer 500 with an awards determination engine 502 permits the issuer 500 to create and implement a vast number of different awards or promotions. As with the other embodiments described herein, in FIG. 5, awards or rewards to cardholders 504 may be provided at the point-of-sale in real-time as a real-time awards/reward 506, or in a cardholder statement or by other conventional means as a post-transaction awards/reward 508, depending upon the implementation. The awards determination engine 502 may operate in a manner as described above, and may include one or more award criteria disclosed herein or as desired.

Referring now to FIG. 6, an example of logical operations for determining awards by the issuer in a credit card processing system, in accordance with one embodiment of the present invention. At operation 602, the customer makes a purchase from a merchant and the merchant's point-of-sale device generates and transmits a payment authorization request to the acquirer. At operation 604, having received the payment authorization request, the acquirer transmits a payment authorization request message. At operation 606, the issuer receives the payment authorization request message. At operation 608, if the payment authorization request is granted, the issuer determines whether the transaction qualifies for an award. Operation 608 may utilize any of the award criteria described herein, or otherwise as desired depending on the particular implementation. If the issuer determines that the transaction is eligible for an award, then at operation 610 the issuer encodes promotion data within the payment authorization response message for transmitting over the network to the acquirer. The payment authorization response message has the appropriate promotion data embedded therein that reflects the type/nature of the specific award being given as well as the amount of the award, in one example. In one example, operations 608-610 may be implemented by the awards determination engine 502 of FIG. 5.

At operation 610, the award can be applied by either the issuer or the payment system operator, if applicable. For instance, a purchase discount amount for the transaction can be calculated based on the terms of the promotion, or loyalty points can be calculated that will be credited to the cardholder.

At operation 612, the payment authorization response is received by the acquirer and the acquirer may perform additional award-related processing if desired, or may merely send the payment authorization response message, which includes the promotion data, to the merchant. At operation 614, the merchant applies the promotion to the customer (if applicable to the particular type of award) and completes the transaction. For instance, if the award was a purchase price discount, then the merchant would complete the purchase, net of the purchase discount; or if the award was a hotel room upgrade communicated via promotion text in the promotion data in the payment authorization response message, then the merchant provides the cardholder with the hotel room upgrade.

Referring again to FIG. 5 and FIG. 7, award processing may occur after the payment request has been authorized, in another embodiment of the invention. Operations 702-712 may be performed in place of operations 602-614 of FIG. 6, in one example. At operation 702, if the payment authorization request is approved, the issuer determines whether the transaction qualifies for an award. This determination may be made in a manner similar to that of operation 608 of FIG. 6.

At operation 704, the issuer encodes promotion data within the payment authorization response message for transmitting over the network to the acquirer. This operation may be implemented in a manner similar to operation 610 of FIG. 6, where the payment authorization response message is encoded with the appropriate promotion data that reflects the type/nature of the specific award being given as well as the amount of the award, in one example. In one example, operations 702 and 704 may be implemented by the awards determination engine 502 of FIG. 5.

The authorization response message is then transmitted, and at operation 706, the acquirer stores the transaction data and promotion related data read from the payment authorization response message. The acquirer then sends the payment authorization response message to the merchant. At operation 708, the merchant completes the transaction and displays any messages to the customer or prints messages on the receipt, if applicable. At operation 710, during transaction settlement, the acquirer submits transaction data and promotion related data in a settlement message transmitted to the payment system operator and issuer. At operation 712, the issuer or payment system operator applies or provides the promotion to the cardholder, if appropriate.

Figure 8:
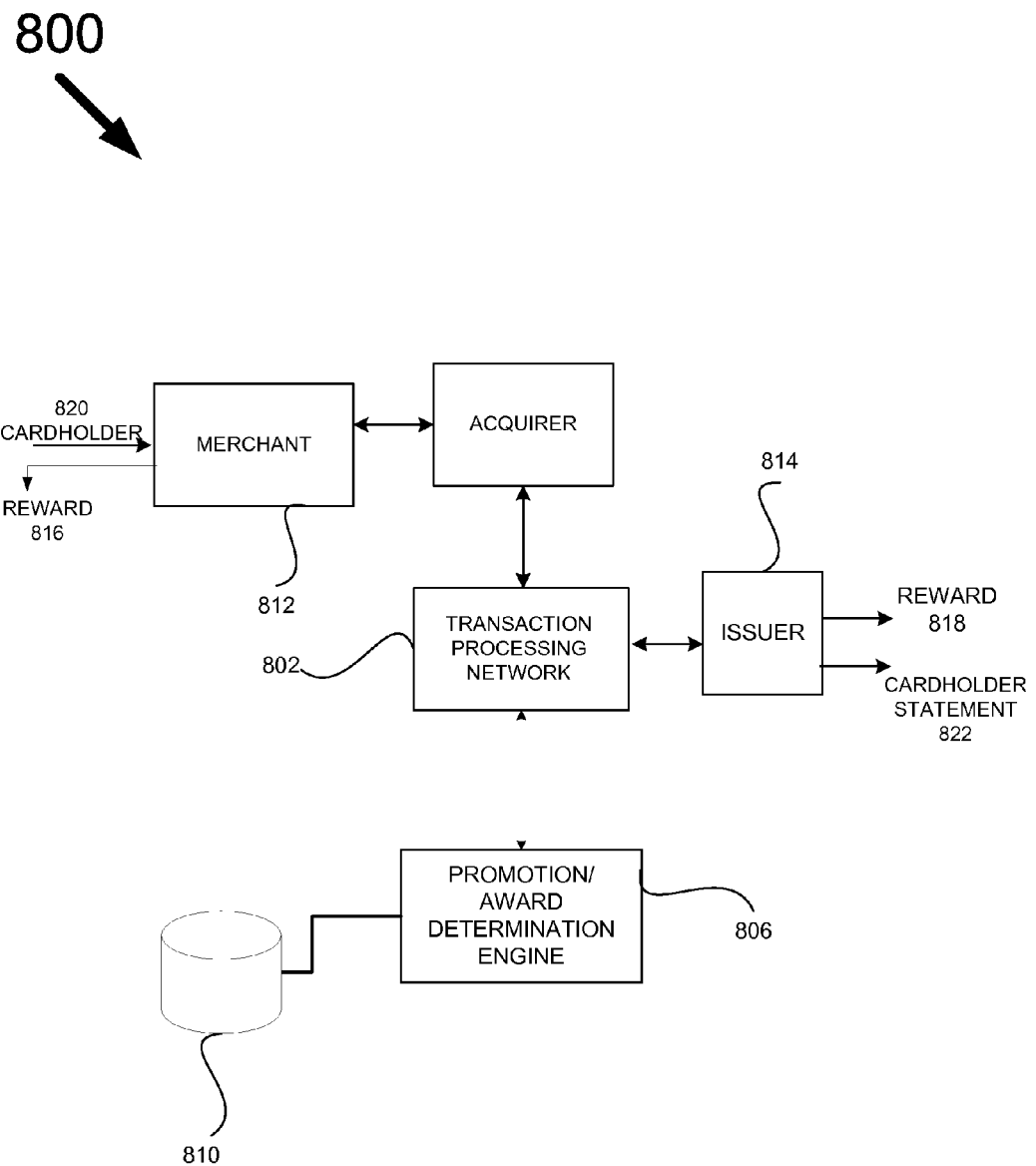
FIG. 8 illustrates a block diagram of a credit card processing system wherein the transaction processing network has an awards determination engine, in accordance with one embodiment of the present invention.

FIG. 8 illustrates a block diagram of a financial-transaction processing system 800 wherein a transaction processing network 802 is operated by a system operator. The network 802 includes an rewards/awards determination engine 806 and a database 810, in accordance with one embodiment of the present invention. This embodiment can be implemented, for example, where the system operator desires to provide awards for use of its financial-transaction tools (such as credit, prepaid, or debit based financial tools) where the system operator jointly offers promotions with at least one merchant 812 (such as a retail chain) or at least one issuer 814. As with the other embodiments described herein, in FIG. 8 the awards/rewards 816 and 818 to a cardholder 820 may be provided to the cardholder 820 at the point-of sale in real-time or in a cardholder statement 822, respectively, or by other conventional means, depending upon the implementation. The awards determination engine 86 may operate in a manner as described above, and may include one or more award criteria disclosed herein or as desired.

Figure 9:
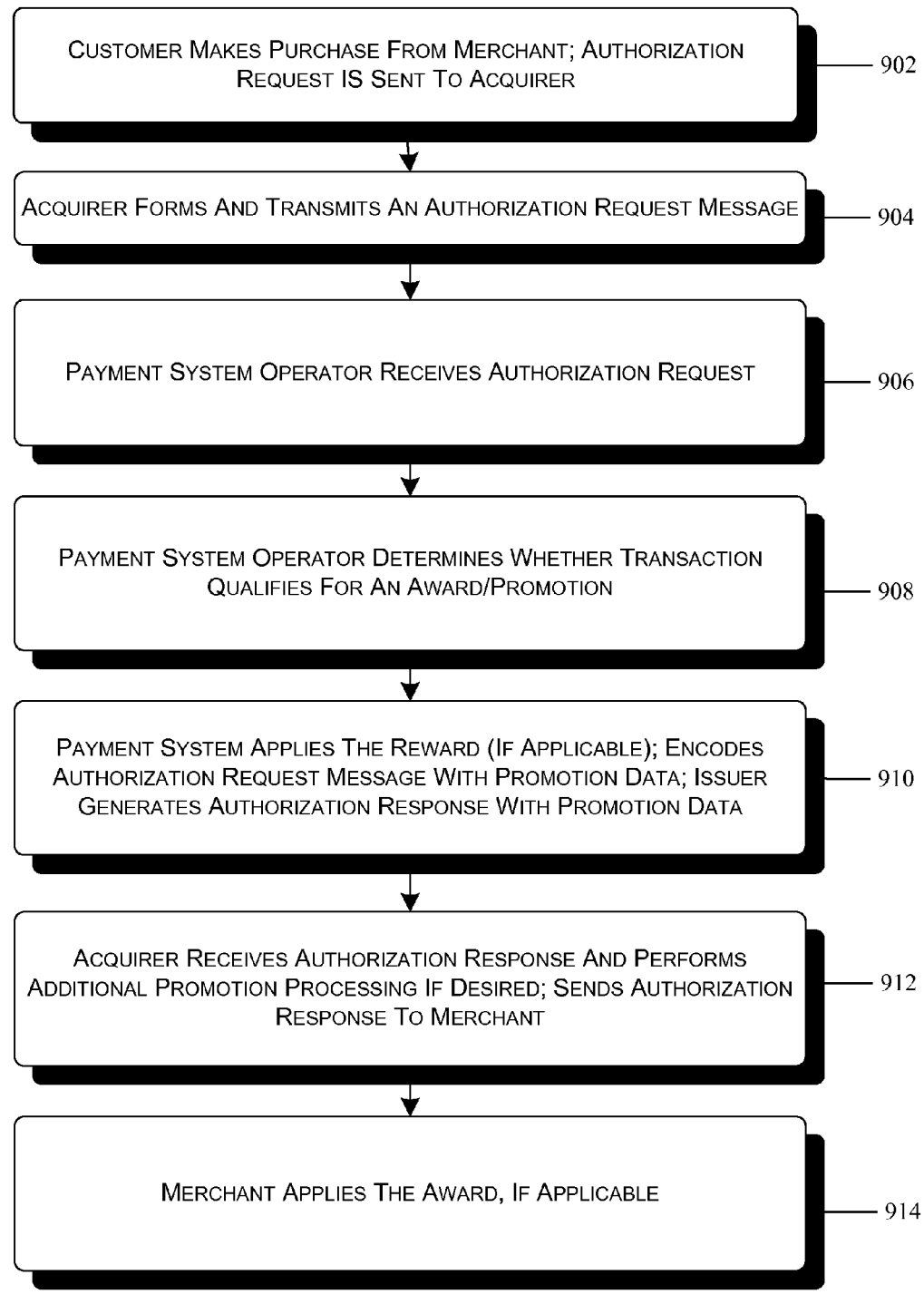
FIG. 9 illustrates an example of logical operations for determining awards by the transaction processing network in a credit card processing system, in accordance with one embodiment of the present invention.

Referring now to FIG. 9, an example of logical operations is shown for determining awards by the transaction processing network in a credit card processing system, in accordance with one embodiment of the present invention.

At operation 902, the customer makes a purchase from a merchant and the merchant's point-of-sale device generates and transmits a payment authorization request to the acquirer. At operation 904, having received the payment authorization request, the acquirer transmits a payment authorization request message over the network. At operation 906, the payment system operator receives the payment authorization request message. At operation 908, the payment system operator determines whether the transaction qualifies for an award. Operation 908 may utilize any of the award criteria described herein, or otherwise as desired depending on the particular implementation. If the payment system operator determines that the transaction is eligible for an award, then at operation 910 the payment system operator encodes promotion data within the payment authorization request message for transmitting over the network to the issuer.

If the issuer approves the transaction, the payment authorization response message is formed with the appropriate promotion data embedded therein that reflects the type/nature of the specific award being given as well as the amount of the award, in one example. At operation 910, the award can be applied by either the payment system operator of the issuer, if applicable. For instance, a purchase discount amount for the transaction can be calculated based on the terms of the promotion, or loyalty points can be calculated that will be credited to the cardholder. In one example, operations 908 and 910 may be implemented by the awards determination engine of FIG. 8.

At operation 912, the payment authorization response is received by the acquirer and the acquirer may perform additional award-related processing if desired, or may merely send the payment authorization response message, which includes the promotion data, to the merchant. At operation 914, the merchant applies the promotion to the customer (if applicable to the particular type of award) and completes the transaction. For instance, if the award was a purchase price discount, then the merchant would complete the purchase, net of the purchase discount; or if the award was a hotel room upgrade communicated via promotion text in the promotion data in the payment authorization response message, then the merchant provides the cardholder with the hotel room upgrade.

Figure 10:
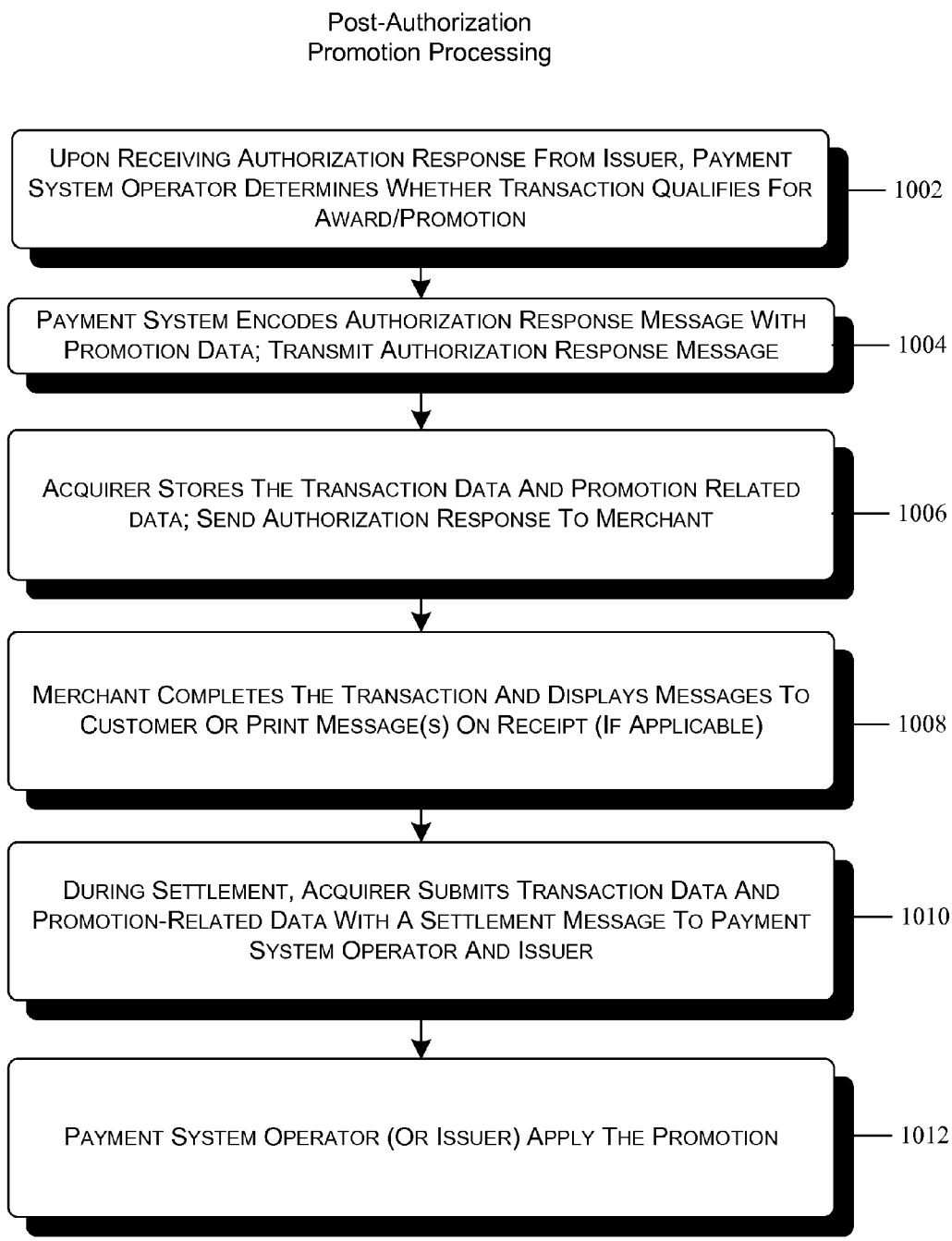
FIG. 10 illustrates an example of logical operations for determining awards, after transaction authorization, by a transaction processing network in a credit card processing system, in accordance with one embodiment of the present invention.

In FIG. 8, award processing may occur after the payment request has been authorized, in another embodiment of the invention, as shown in FIG. 10. Referring now to FIG. 10, operations 1002-1012 of FIG. 10 may be performed in place of operations 908-914 of FIG. 9, in one example. In FIG. 10, at operation 1002, if the payment authorization request is approved by the issuer, payment system operator determines whether the transaction qualifies for an award. This determination may be made in a manner similar to that of operation 908 of FIG. 9.

At operation 1004, the payment system operator encodes promotion data within the payment authorization response message for transmitting over the network to the acquirer. This operation may be implemented in a manner similar to operation 910 of FIG. 9, as the payment authorization response message is encoded with the appropriate promotion data that reflects the type/nature of the specific award being given as well as the amount of the award, in one example. Operations 1002 and 1004 may be implemented by the awards determination engine of FIG. 8.

The authorization response message is then transmitted, and at operation 1006, the acquirer stores the transaction data and promotion related data read from the payment authorization response message. The acquirer then sends the payment authorization response message to the merchant. At operation 1008, the merchant completes the transaction and displays any messages to the customer or prints messages on the receipt, if applicable. At operation 1010, during transaction settlement, the acquirer submits transaction data and promotion related data in a settlement message transmitted to the payment system operator and issuer. At operation 1012, the issuer or payment system operator applies or provides the promotion to the cardholder, if appropriate.

Figure 12:
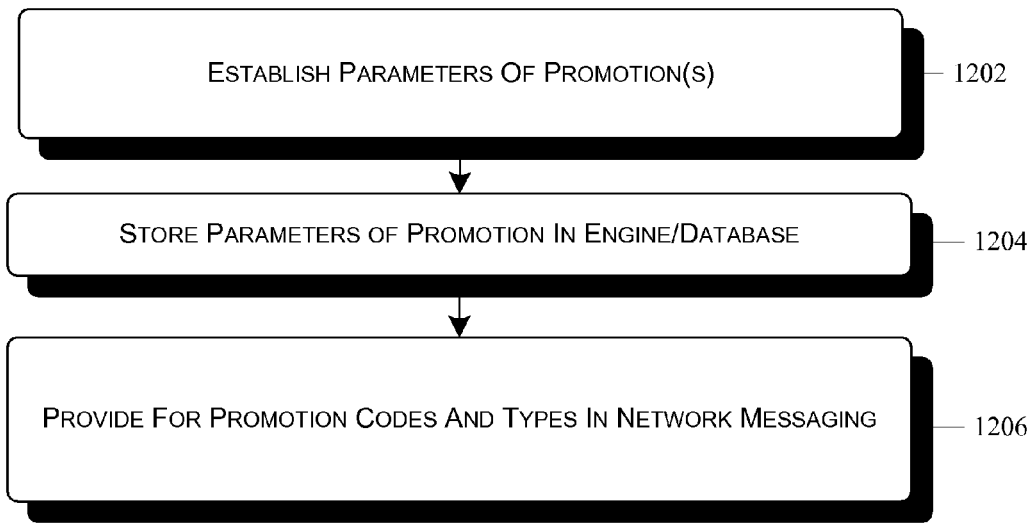
FIG. 12 illustrates an example of operations for setting up a promotion in a credit card processing network, in accordance with one embodiment of the present invention.

FIG. 12 illustrates an example of operations for setting up a promotion in a processing network, in accordance with one embodiment of the present invention. At operation 1202, parameters of the promotion can be established and defined. In defining the parameters of the promotion, one or more award criteria, including but not limited to the award criteria described herein, may be utilized. At operation 1204, parameters of the promotion may be stored in the database associated with an award determination engine, or the parameters may be encoded within any rules, operations or functions of an award determination engine. At operation 1206, promotion codes may be defined in the processing system, preferably as part of the communication or message layer of the processing system.

One or more operations or functions disclosed herein may be encoded on a computer readable medium, such as a hard drive or CD-ROM, having one or more code segments for effecting a computing device to perform such an operation or function.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included, if desired, in at least one embodiment of the present invention. Therefore, it should be appreciated that two or more references to "an embodiment" or "one embodiment" or "an alternative embodiment" or "one example" or "an example" in various portions of this specification are not necessarily all referring to the same embodiment. Furthermore, the particular features, structures or characteristics may be combined as desired in one or more embodiments of the invention.

It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

What is claimed is:

1. In an electronic transaction processing system that includes a payment system operator processing a plurality of transactions each between a merchant and a consumer upon an account issued to the consumer by an issuer, and each being submitted by the merchant to an acquirer for processing by the payment system operator who requests the issuer to obtain payment for the transaction from the account and the issuer forwarding the payment to the acquirer to pay the merchant for the transaction, a computer implemented method comprising:

electronically receiving an authorization request for a purchase amount, requested by one said merchant, for one said transaction upon one said account of one said consumer;

electronically determining if the one said transaction is eligible for an award in a promotion by at least comparing data within the authorization request to at least one award criterion to find a match;

after a found match:
      forming a first electronic transmission, for delivery to the issuer of the one said account, including:
         the authorization request; and
         data about the match;
      electronically receiving an authorization response, responsive to said authorization request, authorizing the one said transaction for a discount amount, wherein at least one alternate source is responsible to pay a difference between the purchase amount and the discount amount;

forming a second electronic transmission with information for delivery to the one said merchant engaged in the one said transaction, including:
the received authorization response; and
data indicating that the difference will be paid by the at least one alternate source; and electronically facilitating, for the one said transaction, the transfer to the one said merchant of the payment of the discount amount from the one said account.

2. The computer implemented method of claim 1, wherein the at least one award criterion includes a range of card numbers.

3. The computer implemented method of claim 1, wherein the at least one award criterion includes a merchant identification number.

4. The computer implemented method of claim 1, wherein the at least one award criterion includes a minimum purchase amount.

5. The computer implemented method of claim 1, wherein each of the:
electrically receiving the authorization request;
electrically determining;
forming the first electronic transmission;
electronically receiving the authorization response;
forming the second electronic transmission; and
electronically facilitating is performed by any one selected from the group consisting of the acquirer and the payment system operator.

6. The computer implemented method of claim 1, further comprising electronically encoding the award in the promotion within the first electronic transmission.

7. The computer implemented method of claim 6, wherein the award in the promotion includes data defining a promotion type.

8. The computer implemented method of claim 6, wherein the award in the promotion includes data defining a promotion code.

9. The computer implemented method of claim 6, wherein the award in the promotion includes data defining promotion related text.

10. The computer implemented method of claim 6, wherein the electronically encoding is performed by the acquirer for the one said merchant.

11. The computer implemented method of claim 6, wherein the electronically encoding is performed by the payment system operator.

12. The computer implemented method of claim 1, further comprising electronically encoding the award in the promotion within the second electronic transmission.

13. The computer implemented method of claim 12, wherein the award in the promotion includes data defining a promotion type.

14. The computer implemented method of claim 12, wherein the award in the promotion includes data defining a promotion code.

15. The computer implemented method of claim 12, wherein the award in the promotion includes data defining promotion related text.

16. The computer implemented method of claim 12, wherein the electronically encoding operation is performed by the payment system operator.

17. In an electronic transaction system that includes a payment system operator processing a transaction between a merchant and a consumer upon an account, a computer implemented method comprising:
electronically receiving an authorization request of a merchant for the transaction of a purchase amount upon the account; and
if the consumer engaged in the transaction is electronically determined to be eligible to receive an award, forming an electronic transmission having information for delivery to the merchant that includes:
an authorization of a discounted purchase amount for the transaction upon the account; and
data indicating that a portion of a difference between the purchase amount and the discounted purchase amount will be funded by an alternate source.

18. The computer implemented method of claim 17, wherein the alternate source:
funds the portion of a difference between the purchase amount and the discounted purchase amount; and
is selected from the group consisting of: the merchant, an issuer of the account, a third party, and a combination thereof.

19. The computer implemented method of claim 17, wherein the electronic transmission is an authorization response that is responsive to the authorization request.

20. The computer implemented method of claim 17, further comprising:
forming a second electronic transmission, for delivery to an issuer of the account, including the authorization request that has been modified to be for the discounted purchase amount; and
electronically receiving an authorization response, responsive to the modified said authorization request, authorizing the transaction as payable upon the account for the discounted purchase amount.

21. An apparatus comprising a computer readable medium including stored instructions executable by a computing device to:
electronically receive an authorization request of a merchant for a transaction of a purchase amount upon an account of a consumer;
if the transaction is determined to be eligible for an award, form an electronic transmission having information for delivery to the merchant that includes:
an authorization response authorizing the eligible said transaction for a discount amount that is less than the purchase amount; and
data indicating that a difference between the purchase amount and the discount amount will be funded by an alternate source.

22. The apparatus of claim 21, wherein the computer readable medium further comprises stored instructions executable by the computer device to:
form a second electronic transmission, for delivery to an issuer of the account, including the authorization request that has been modified to be for the discount amount; and
electronically receive an authorization response, responsive to said authorization request, authorizing the transaction as payable upon the account for the discount amount.

23. The apparatus of claim 21, wherein the alternate source is selected from the group consisting of: the merchant, an issuer of the account, a third party, and a combination thereof.

* * * * *